United States Patent [19]

Martin et al.

[11] Patent Number: 6,041,217

[45] Date of Patent: Mar. 21, 2000

[54] PERSONAL HANDYPHONE SYSTEM HARDWARE CHECKING OF BROADCASTING RECEPTION INDICATION

[75] Inventors: Varenka Martin; Denis Archambaud, both of Antibes; Patrick Feyfant, Toulon; Philippe Gaglione, Mandelieu; Satoshi Yoshida, Nice; Laurent Winckel; Oliver Weigelt, both of Antibes, all of France

[73] Assignee: VLSI Technology, Inc., San Jose, Calif.

[21] Appl. No.: 08/902,091

[22] Filed: Jul. 29, 1997

[51] Int. Cl.⁷ .................................................. H04B 7/00
[52] U.S. Cl. .................................. 455/38.3; 455/574
[58] Field of Search ............................ 455/312, 38.3, 455/343, 458, 522, 567, 571–574, 9, 13.4, 426; 370/825.44

[56] References Cited

U.S. PATENT DOCUMENTS

| | | | |
|---|---|---|---|
| 5,224,152 | 6/1993 | Harte | 455/574 |
| 5,301,225 | 4/1994 | Suzuki et al. | 455/574 |
| 5,404,355 | 4/1995 | Raith | 455/343 |
| 5,471,655 | 11/1995 | Kivari | 455/343 |
| 5,581,244 | 12/1996 | Jokimies et al. | 455/38.3 |
| 5,590,396 | 12/1996 | Henry | 455/574 |
| 5,799,256 | 8/1998 | Pombo et al. | 455/38.3 |

OTHER PUBLICATIONS

"Personal Handy Phone System ARIB Standard Version 2 RCR STD–28", Association of Radio Industries and Businesses (ARIB), Introduction, Table of Contents, pp. 1–177 and 481–487 (Dec. 26, 1995).

Primary Examiner—Paul Loomis
Assistant Examiner—George Eng

[57] ABSTRACT

A circuit arrangement on a handset for monitoring changes in the system parameters of a personal handyphone system by hardware checking the broadcasting reception indication (BRI) pattern. The circuit arrangement includes a memory portion for storing the previous BRI pattern received at the circuit arrangement, and an interrupt generator for comparing the stored previous BRI pattern with a current BRI pattern and for generating an interrupt to activate the handset processor when the previous BRI pattern differs from the current BRI pattern.

18 Claims, 2 Drawing Sheets

PERSONAL HANDYPHONE SYSTEM HARDWARE CHECKING OF BROADCASTING RECEPTION INDICATION

BACKGROUND OF THE INVENTION

The present invention relates to an apparatus and method for checking paging information transmitted in a Personal Handyphone System (PHS), and in particular, to an apparatus and method for monitoring changes in the system parameters with reduced power consumption by hardware checking the broadcasting reception indication pattern of the paging channel.

Cellular telephone communications systems allow users to communicate via portable stations or handsets without the use of a wire or cable connection. Voice and data is transmitted in cellular telephone technology through radio waves at a particular frequency. By eliminating the need for a hard-wire connection, cellular telephones can be used, for example, in a car or on an airplane. The increased use of cellular telephones in recent years is due in large part to this mobile feature.

There are various cellular telephone services under which cellular telephones operate. One system is the Personal Handyphone System (PHS). The PHS is a high capacity fully digital mobile cellular telephone service that was originally launched in Japan in 1995. Like other cellular telephone services, the PHS has its own operation standard governing the use of radio facilities and equipment that transmit over radio waves within the system.

A desirable feature for any cellular telephone is a handset that is sized to allow it to be easily managed and transported. For example, it is preferable to provide a handset with an overall size that can be carried in a handbag, such as a purse, or a pocket of a jacket.

One of the components of a handset that significantly affects the overall size of the handset is the battery. The battery is removably attached to the handset to provide power needed to operate the handset. When power is depleted from the battery, it is removed and recharged or replaced with another battery. While a smaller battery may be preferred for convenient transporting of the handset, a smaller sized battery compromises the amount of power that the battery provides to the handset between charges.

A typical handset continuously drains power from the battery when the handset is in a standby mode or is otherwise processing control information associated with a data transfer to the handset. During standby, the handset's processor continually receives and processes packets of control information unique to particular data transfers. The control information may include the identification numbers of the called handset, the calling handset, and the base station that facilitates the transmission between the called handset and the calling handset. Moreover, the control information may identify the attributes or the type of data that is being transmitted. Similarly, the control information may identify the parameters in which the PHS operates. By processing the control information during standby, a handset determines, for example, if there are any changes in the system parameters such as changes in frequencies or time slots. If so, the system is updated with these new system parameters. Not surprisingly, the processing of control information at the handset's processor draws considerable power from the battery. In turn, this limits the length of time for which a handset can operate with a given battery.

A possible solution to the problem of power consumption is to increase the size of the battery or to carry one or more spare batteries to replace a depleted battery. Both of these options, however, minimize the mobility advantages offered by cellular telephone technology as it increases the size of the handset or the number of components that are needed to operate the handset.

Based on the foregoing, it can be seen that a tension exists between providing a conveniently-sized cellular telephone handset and the desire to reduce power consumption of the handset to increase the period of time between charging.

SUMMARY OF THE INVENTION

The present invention is directed to a circuit arrangement for monitoring changes in the system parameters of a personal handyphone system by hardware checking the broadcasting reception indication (BRI) pattern. The circuit arrangement includes a memory portion for storing the previous BRI pattern received at the circuit arrangement, and an interrupt generator for comparing the stored BRI pattern with a current BRI pattern and for generating an interrupt to activate the handset processor when the previous BRI pattern differs from the current BRI pattern.

The present invention is further directed to a method for monitoring changes in the system parameters of the personal handyphone system. The method includes storing a previous BRI pattern in a memory portion, generating an interrupt when the previous BRI pattern differs from a current BRI pattern received at the handset, passing the interrupt to the processor, and initiating processing of new system parameters at the processor in response to the interrupt.

The above summary of the present invention is not intended to describe each illustrated embodiment or every implementation of the present invention. This is the purpose of the figures and of the detailed description that follow.

BRIEF DESCRIPTION OF THE DRAWINGS

Other aspects and advantages of the invention will become apparent upon reading the following detailed description and upon reference to the drawings in which.

Figure 1:
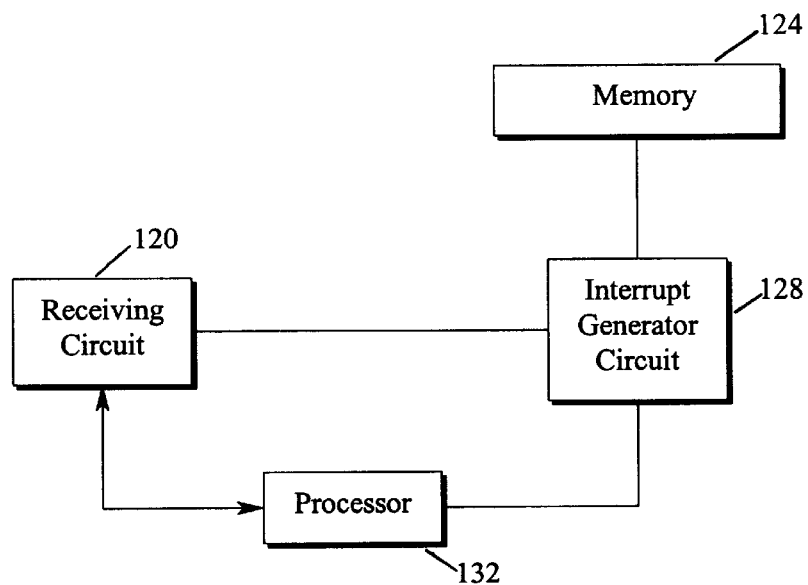
FIG. 1 illustrates an exemplary hardware circuit in a cellular telephone for use in accordance with one embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives fitting within the spirit and scope of the invention as defined by the appended claims.

DESCRIPTION OF THE ILLUSTRATED EMBODIMENTS

In exemplary embodiments of the present invention, a hardware circuit arrangement, apart from the processor, on a cellular telephone handset is configured and arranged to monitor transmitted control information with reduced power consumption. When a handset is in standby mode, waiting to receive a call, the hardware circuit arrangement monitors control information transmitted in a paging channel. The control information includes the broadcasting reception indication (BRI) pattern which indicates whether there are any changes in the system parameters. These system parameters are subsequently transmitted in the broadcast control channel. If the BRI pattern indicates a change in the system parameters, the system is updated with these new system parameters upon receipt through the broadcast control channel.

FIG. 1 illustrates an exemplary system, including a hardware circuit arrangement apart from the processor 132, for checking paging information with reduced power consumption in a cellular telephone. The system of FIG. 1 includes receiving circuit 120 which receives the control information transmitted in the paging channel. Receiving circuit 120 is coupled to interrupt generator circuit 128. Receiving circuit 120 passes received control information, including the BRI pattern, to interrupt generator circuit 128. Interrupt generator circuit 128 is coupled to memory portion 124.

Memory portion 124 stores the BRI pattern corresponding to the current system parameters. Memory portion 124 may be one memory block or multiple discrete memory blocks. Moreover, memory portion 124 may be any type of storage medium such as a random access memory (RAM), electronic programmable read only memory, electronic erasable programmable read only memory, flash memories, flip-flops, or latches. When a BRI pattern corresponding to new system parameters is received at the handset, it replaces the BRI pattern corresponding to the current system parameters and stored in memory portion 124.

Interrupt generator circuit 128 receives the transmitted BRI pattern from the receiving circuit 120 and compares that BRI pattern with the BRI pattern stored in memory portion 124. Interrupt generator circuit 128 is coupled to processor 132. Processor 132 receives a signal from interrupt generator circuit 128. The signal passing from the interrupt generator circuit 128 to the processor 132 communicates the result of the comparison performed at interrupt generator circuit 128.

The elements of FIG. 1 are typically powered by a power supply (not shown). The power supply may be, for example, a portable battery that removably attaches to the telephone handset.

In one embodiment of FIG. 1, the interrupt generator circuit 128 compares the BRI pattern stored in memory portion 124 with the BRI pattern transmitted in the paging channel. If the stored BRI pattern differs from the transmitted BRI pattern, the interrupt generator circuit 128 produces an interrupt signal. The interrupt signal passes to the processor 132. The processor 132 activates (or wakes up) in response to the interrupt. Once activated, the processor 132 updates the system with the new system parameters subsequently received at the handset through the broadcast control channel. In this embodiment, the processor 132, upon receipt of the interrupt, remains active while waiting for receipt of the new system parameters.

The system of FIG. 1 may further include an internal timer (not shown). The timer may be programmed to activate the processor 132 a predetermined period of time after receipt of the interrupt signal. In one embodiment including a timer, after the interrupt signal passes to and activates the processor 132, the processor 132 determines from the control information contained within the paging channel the amount of time until the new system parameters will be received from the broadcast control channel. The processor then sets the timer to activate the processor immediately prior to receipt of the new system parameters, and powers itself down. In a similar embodiment having a timer, if the time between receipt of the BRI pattern corresponding to new system parameters and receipt of the new system parameters in the broadcast control channel is known prior to generating an interrupt and activating the processor 132, the timer can be preprogrammed to delay activation of the processor 132 until immediately prior to receipt of the new system parameters at the handset. In this embodiment, the processor 132 remains powered down between receipt of the new BRI pattern and the time that the updated system parameters are received in the broadcast control channel at the handset. Both of these embodiments further decrease the amount of time in which the processor 132 is activated, thereby saving additional power.

Monitoring the control information with a hardware circuit arrangement located on the cellular telephone separate from the telephone's processor saves significant power. When the hardware circuit arrangement configured according to the present invention monitors control information, the processor and the processor's memory are in a power down mode. The processor and its corresponding memory activate (or power up) only after the separate hardware circuit arrangement detects, by comparing the transmitted and stored BRI patterns, that new system parameters are being transmitted in the broadcast control channel. As such, the processor and memory are not drawing significant power from the cellular telephone battery during standby mode. Since the hardware circuit arrangement requires significantly less power to operate than the processor and its corresponding memory, use of the hardware circuit arrangement to monitor for changes in the system parameters during standby provides significantly less drain on the battery.

Figure 2:
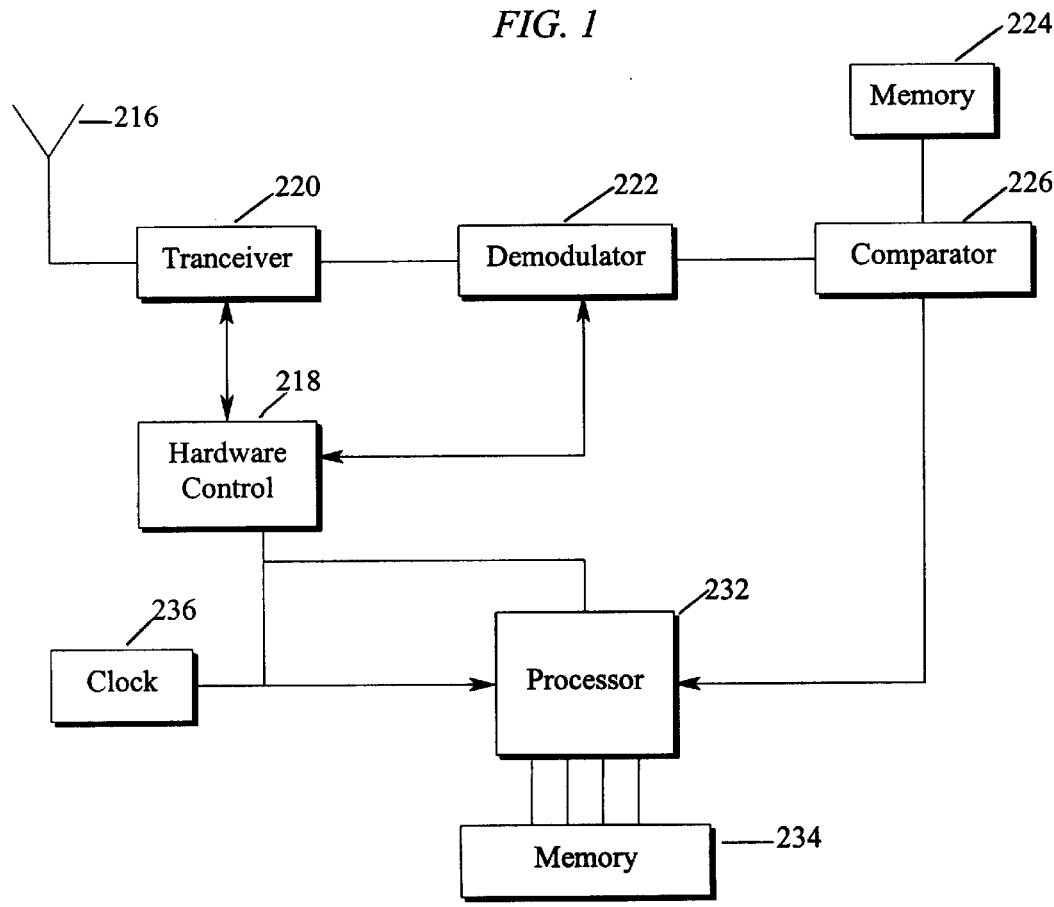
FIG. 2 illustrates another embodiment of a hardware circuit in accordance with the present invention.

FIG. 2 illustrates another embodiment of the invention in block diagram form. Antenna 216, which receives control information transmitted in the paging channel, connects to transceiver 220. Transceiver 220 connects to demodulator 222. It should be appreciated that transceiver 220 represents any type of transmitter/receiver arrangement whether incorporating common elements or formed separately. A hardware controller 218 connects to and bidirectionally communicates with both transceiver 220 and demodulator 222. The hardware controller 218 controls the hardware of the system of FIG. 2 in a manner well known in the art. Control information received at antenna 216 passes to transceiver 220 which in turn passes to demodulator 222. The control information then passes to comparator 226 which connects to demodulator 222. Comparator 226, which is coupled to memory portion 224, compares the BRI pattern transmitted in the paging channel with the BRI pattern corresponding to the current system parameters and stored in memory portion 224.

Comparator 226 connects to processor 232. The comparator 226 passes an output signal to processor 232 which communicates the result of the comparison. The output signal has either a first state indicating the transmitted BRI pattern matches the stored BRI pattern, or a second state indicating the transmitted BRI pattern differs from the stored BRI pattern. As mentioned, if the BRI patterns differ, the corresponding output signal activates the processor 232.

The system of FIG. 2 further includes master clock 236. Master clock 236 connects to hardware controller 218 and processor 232. The master clock 236 is used for general system operations. The clock 236 may also be used, for example, in connection with a timer to initiate processing of new system parameters at the processor a predetermined period of time after receipt of an interrupt signal.

Figure 3:
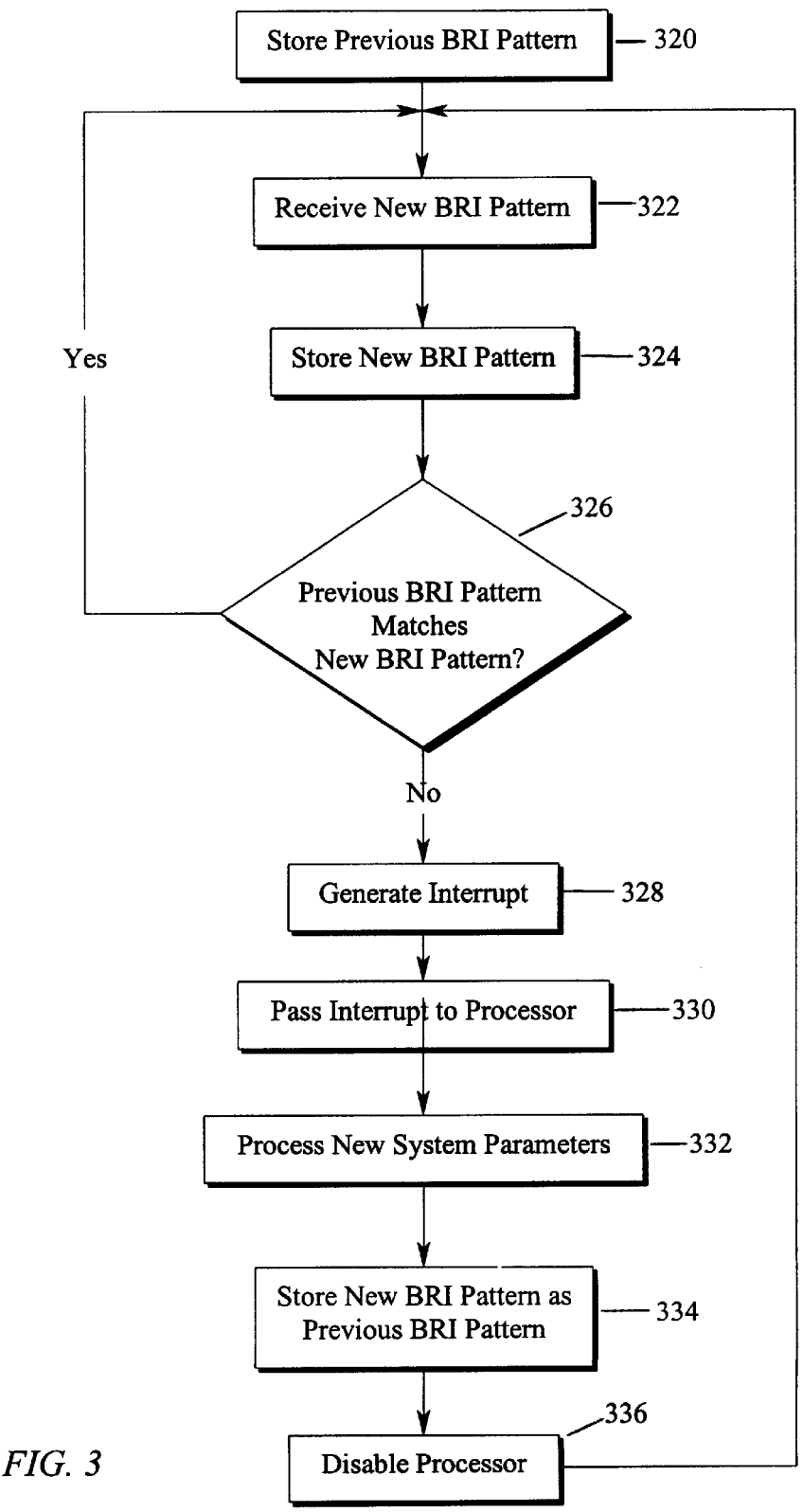
FIG. 3 is a flowchart illustrating exemplary steps, according to one embodiment of the present invention, for checking paging information in a personal handyphone system.

FIG. 3 illustrates a method for checking paging information according to one embodiment of the present invention. Initially, a BRI pattern is stored in the memory portion of the cellular telephone as illustrated in block 320. This BRI pattern corresponds to the current system parameters. The memory portion storing the BRI pattern could be, for example, a random access memory (RAM). Subsequently, the cellular telephone receives a new BRI pattern in the paging channel as depicted in block 322. The new BRI pattern may be received at the handset after the stored BRI pattern with or without any intervening BRI patterns being received at the handset.

As illustrated in block 324, the new BRI pattern is stored in the memory portion. The specific memory address in which the new BRI pattern is stored in block 324 is separate from the specific memory address in which the BRI pattern corresponding to the present system parameters is stored in block 320. The BRI pattern corresponding to the current system parameters is compared to the new BRI pattern as shown in block 326. If the BRI patterns match, the processor remains in a power down mode and the hardware circuit of the receiver resumes monitoring the paging channel for subsequent BRI patterns. If the patterns differ, which indicates that new system parameters are being transmitted in the broadcast control channel, an interrupt is generated which passes to the processor as indicated by blocks 328 and 330. The processor, which previously had been in a low power mode, activates (or powers up) in response to the interrupt and processes the new system parameters subsequently received in the broadcast control channel as indicated by block 332. As depicted in block 334, the new BRI pattern corresponding to the new system parameters then replaces the BRI pattern corresponding to the previous system parameters in the memory address that stores the BRI pattern corresponding to the current system parameters. As such, the new BRI pattern becomes the BRI pattern which is compared with the next BRI pattern to be received at the handset. The processor subsequently resumes a low power mode after a predetermined period of time, as shown in block 336, as well understood in the art.

As noted above, the present invention is applicable to an apparatus and method for monitoring changes in the system parameters by hardware checking the BRI pattern. Accordingly, the present invention should not be considered limited to the particular examples described above, but rather should be understood to cover all aspects of the invention as fairly set out in the attached claims. Various modifications, equivalent processes as well as numerous communication devices to which the present invention will be applicable will be readily apparent to those of skill in the art upon review of the present specification. The claims are intended to cover such modifications and devices.

We claim:

1. A circuit arrangement for checking paging information transmitted in a personal handyphone system to a portable station, and for selectively activating a processor to analyze new system parameters transmitted in a broadcast control channel, the paging information including a broadcasting reception indication pattern, the circuit arrangement comprising:

a first memory portion for holding a previous broadcasting reception indication pattern;

an interrupt generator coupled to the first memory portion and the processor, the interrupt generator adapted to compare the previous broadcasting reception indication pattern with a current broadcasting reception indication pattern and to generate an interrupt when the current broadcasting reception indication pattern differs from the previous broadcasting reception indication pattern, the processor, in response to the interrupt, processing new system parameters corresponding to the current broadcasting reception indication pattern.

2. The circuit arrangement according to claim 1, further comprising a second memory portion for holding the current broadcasting reception indication pattern.

3. A circuit arrangement according to claim 1, wherein the interrupt generator includes a comparator coupled to receive the current and previous broadcasting reception indication patterns, the comparator adapted to provide an output having a first or second state, wherein the output signal is a first state when the previous broadcasting reception indication pattern differs from the current broadcasting reception indication pattern, the processor, in response to the first state, adapted to process the new system parameters corresponding to the current broadcasting reception indication pattern.

4. A circuit arrangement according to claim 1, wherein the current broadcasting reception indication pattern is consecutively received at the portable station after the previous broadcasting reception indication pattern.

5. A circuit arrangement according to claim 1, further comprising a timer, the processor initiating processing of the new system parameters a predetermined period of time after receipt of the interrupt.

6. A circuit arrangement according to claim 1, wherein the first memory portion is a random access memory.

7. A circuit arrangement according to claim 1, wherein the current broadcasting reception indication pattern is stored as a new previous broadcasting reception indication pattern in the first memory portion when the previous broadcasting reception indication pattern differs from the current broadcasting reception indication pattern for comparison with subsequent broadcasting reception indication patterns.

8. A cellular telephone for operating in a personal handyphone system, the telephone comprising:

a receiver for receiving paging information, the paging information including a broadcasting reception indication pattern;

a circuit arrangement coupled to the receiver and having a memory portion for holding a previous broadcasting reception indication pattern, and an interrupt generator coupled to the memory portion, the interrupt generator adapted to compare the previous broadcasting reception indication pattern with a current broadcasting reception indication pattern and to generate an interrupt when the previous broadcasting reception indication pattern differs from the current broadcasting reception indication pattern;

a processor coupled to the interrupt generator to receive the interrupt, the processor, in response to the interrupt, processing new system parameters corresponding to the current broadcasting reception indication pattern; and a portable power supply coupled to the processor and the interrupt generator.

9. A telephone according to claim 8, wherein the current broadcasting reception indication pattern is consecutively received at the receiver after the previous broadcasting reception indication pattern.

10. A telephone according to claim 8, wherein the current broadcasting reception indication pattern is stored as a new previous broadcasting reception indication pattern in the memory portion when the previous broadcasting reception indication pattern differs from the current broadcasting reception indication pattern for comparison with subsequent broadcasting indication reception patterns.

11. A telephone according to claim 8, further comprising a timer, the processor initiating processing of the new system parameters a predetermined period of time after receipt of the interrupt.

12. A telephone according to claim 8, wherein the interrupt generator includes a comparator coupled to receive the previous and current broadcasting reception indication patterns, the comparator providing an output having a first or second state, wherein the output signal is a first state when the previous broadcasting reception indication pattern differs from the current broadcasting reception indication pattern, the processor, in response to the first state, processing the new system parameters corresponding to the current broadcasting reception indication pattern.

13. A telephone according to claim 8, wherein the memory portion is a random access memory.

14. A method for checking paging information transmitted in a personal handyphone system to a portable station having a circuit arrangement for generating an interrupt based on the paging information to pass to a processor, the paging information including a broadcasting reception indication pattern, the method comprising:

storing a previous broadcasting reception indication pattern in a first memory portion;

comparing the previous broadcasting reception indication pattern with a current broadcasting reception indication pattern:

generating an interrupt at the circuit arrangement when the current broadcasting reception indication pattern differs from the previous broadcasting reception pattern;

passing the interrupt to the processor; and initiating processing at the processor of new system parameters corresponding to the current broadcasting reception pattern in response to the interrupt.

15. A method according to claim 14, wherein the current broadcasting reception indication pattern is consecutively received at the portable station after the previous broadcasting reception indication pattern.

16. A method according to claim 14, wherein the processor processes the new system parameters a predetermined period of time after receipt of the interrupt.

17. A method according to claim 14, further comprising storing the current broadcasting reception indication pattern in a second memory portion.

18. A method according to claim 14, further comprising storing the current broadcasting reception indication pattern as a new previous broadcasting reception indication pattern in the first memory portion when the previous and current broadcasting reception indication patterns differ.

* * * * *